M. M. RIPHAHN.
VEHICLE LAMP.
APPLICATION FILED MAY 29, 1914.
1,139,725.
Patented May 18, 1915.
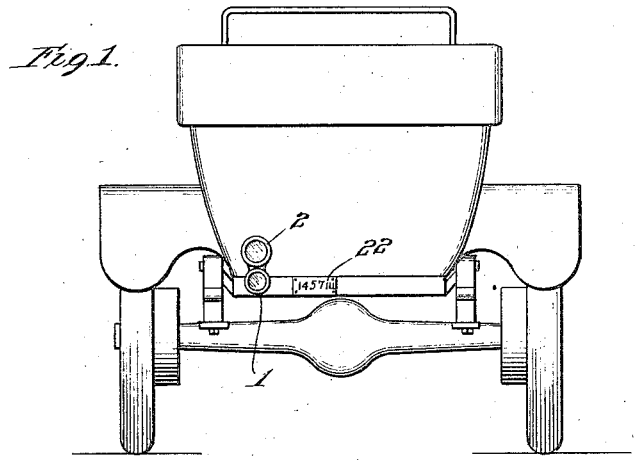
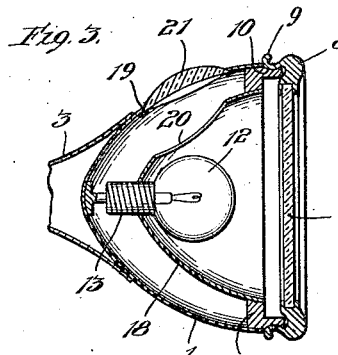
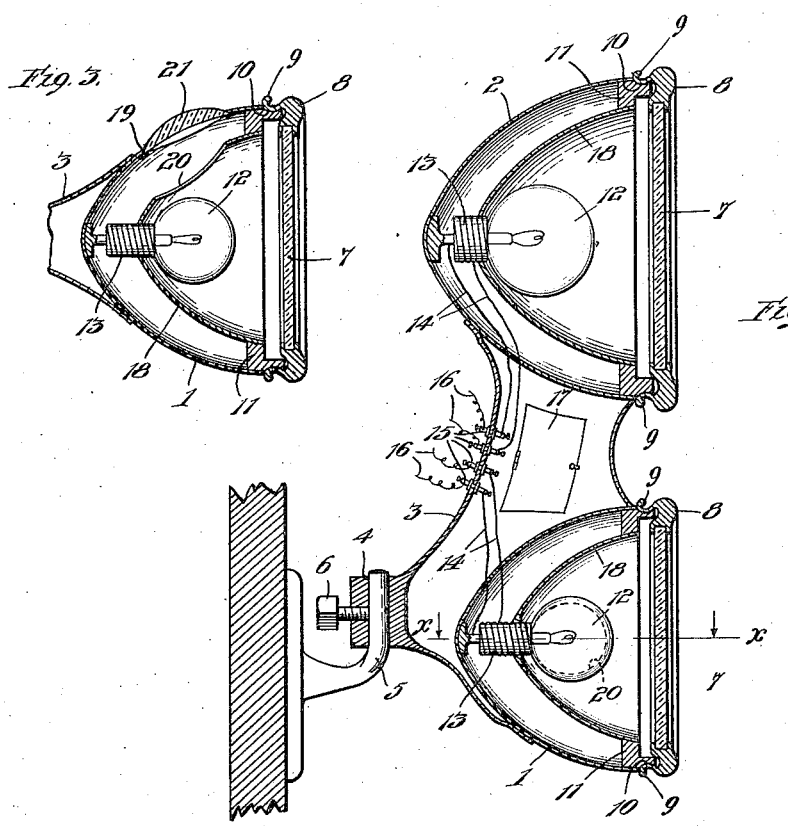
Witnesses:
H. S. Bull.
A. A. Olson.
Inventor,
Martin M. Riphahn,
by Joshua R. H. Potts
his Attorney.

UNITED STATES PATENT OFFICE.

MARTIN M. RIPHAHN, OF WAUNAKEE, WISCONSIN.

VEHICLE-LAMP.

1,139,725.

Specification of Letters Patent.   Patented May 18, 1915.

Application filed May 29, 1914. Serial No. 841,757.

*To all whom it may concern:*

Be it known that I, MARTIN M. RIPHAHN, a citizen of the United States, and a resident of the city of Waunakee, county of Dane, and State of Wisconsin, have invented certain new and useful Improvements in Vehicle-Lamps, of which the following is a specification.

My invention relates to vehicle lamps and more specifically to a lamp of this character designed for use at the rear of a vehicle to serve as a tail signal light, a means for illuminating the road-way in backing up the vehicle, and a means for illuminating the license number of the vehicle.

The object of my invention is the production of a lamp of the character mentioned which will be of durable and economical construction and efficient in use.

Other objects will appear hereinafter.

With these objects in view my invention consists in the combinations and arrangements of parts hereinafter described and claimed.

The invention will be best understood by reference to the accompanying drawing forming a part of this specification, and in which—

Figure 1 is a rear elevation of an automobile equipped with a lamp embodying my invention, Fig. 2 is a central vertical section of the lamp, and Fig. 3 is a section taken on line *x*—*x* of Fig. 2.

The preferred form of construction as illustrated in the drawing comprises a lamp consisting of two sections 1 and 2 each of substantially parabolic form, the section 1 being a little smaller than the section 2. Said sections 1 and 2 are rigidly connected by means of a tubular or hollow neck 3, the latter being provided at its rearward side with a socket 4 for engagement with a supporting bracket 5 provided at the rear end of the vehicle upon which the lamp is used.
A set screw 6 is provided for securely fastening the lamp to the supporting bracket 5 as will be readily understood.

The front side of each of the lamp sections 1 and 2 is open and arranged thereover is a lens 7 mounted in a suitable circular frame or holder 8. The rearward side of the lens frame 8 is provided with a resilient annular lip 9 adapted for engagement with an annular groove 10 provided in the periphery of an annular reinforcing member 11 provided at the mouth of each of the sections 1 and 2. With this arrangement it will be seen that the lens of each section is releasably secured in position so that the same may be readily removed when desired in order to gain access to the interior of the lamp. The arrangement is such however that a tight connection is afforded between the lens and the body of each lamp section so as to effectually exclude dust from the interior of the lamp.

Arranged in each section 1 centrally behind the lens 7 is an electric lamp bulb 12 the plug of which is threaded in a socket 13 rigidly secured in each section 1 and 2 at the rearward end thereof. The conductor wires 14 coöperating with each electric lamp bulb 12 extend from the latter through openings provided in the adjacent sides of the sections 1 and 2, being connected at their outer ends with connections or binding posts 15 arranged in the neck 3 at the rearward side thereof. The outer ends of said binding posts or connections are connected with conductor wires 16 which lead to the source of electrical energy carried in the vehicle in conjunction with which the lamp is employed. The illuminating means of each section of the lamp is included in an electric circuit which is independent of the circuit coöperating with the illuminating means of the other section so that in use, the two parts of the lamp may be independently controlled as will be readily understood. One side of the neck 3 is equipped with a hinged door 17 through which access may be gained to the inner ends of the connections or binding posts 15 for adjustment of the conductor wires 14 as will be readily understood.

Arranged in each of the sections 1 behind the electric lamp bulb 12 thereof is a reflector 18 of parabolic form, the front end of said reflector being secured as shown to the annular member 11 arranged at the 1 front end of each of said sections. Formed at the side of the section 1 is an opening 19 positioned in the same horizontal plane with the illuminating means of said section, and formed in the adjacent corresponding side of the reflector 18 is an opening 20. Arranged in the opening 19 is a lens 21, the arrangement being such that in the operation of the lamp, in addition to a ray of light being thrown forwardly from the section 1, a ray of light will also be thrown laterally for illumination of the license number plate 22 of the vehicle.

In practice the lamp section 1 will be equipped with a lens 7 which is colored red, this section of the lamp being designed to serve as a rear signal or tail light. The lens 7 of the section 2 will be simply plain glass, this section of the lamp being designed to serve as a rear illuminating means in order to illuminate the road-way at the rear of the vehicle in backing up. The provision of illuminating means at the rear of the vehicle such as is afforded by the section 2 of the lamp is of great advantage especially on country roads and generally where the road-way is dark and unilluminated obviating the necessity of a hand lamp being used by an assistant to the operator of the car such as is necessary at the present time. By using separate electric circuits for coöperation with each of the sections of the lamp it is evident that the signal section 1 may be constantly lighted when a signal is necessary and the section 2 lighted only when it is desired to back up the vehicle.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A lamp comprising two lamp sections; a hollow neck rigidly connecting said sections; binding posts extending through the wall of said neck; supply wires connected with the outer ends of said binding posts; wires connected with the inner ends of said binding posts and leading to said lamp sections; and a door giving access to said neck, substantially as described.

In testimony whereof I have signed my name to this specification in the presence of two subscribing witnesses.

MARTIN M. RIPHAHN.

Witnesses:
HARRY J. KOLTES,
G. SCHUNK.